(12) United States Patent
Gallego Hugas et al.

(10) Patent No.: US 7,394,775 B2
(45) Date of Patent: Jul. 1, 2008

(54) DISTRIBUTED SYSTEM AND METHOD FOR THE REMOTE ACQUISITION OF DATA IN PACKETS WITH A COMMUNICATION PROTOCOL WHICH OPTIMIZES THE TRANSMISSION SPEED

(75) Inventors: Fernando Gallego Hugas, Valls (ES); Ernest Gil Doucet, Valls (ES)

(73) Assignee: Lear Corp., Southfield, MI (US)

( * ) Notice: Subject to any disclaimer, the term of this patent is extended or adjusted under 35 U.S.C. 154(b) by 779 days.

(21) Appl. No.: 10/709,690

(22) Filed: May 22, 2004

(65) Prior Publication Data
US 2004/0202201 A1  Oct. 14, 2004

(51) Int. Cl.
*H04B 1/44* (2006.01)
(52) U.S. Cl. .................. 370/282; 370/546; 370/503
(58) Field of Classification Search .......... 370/282, 370/503, 389, 546
See application file for complete search history.

(56) References Cited

U.S. PATENT DOCUMENTS

| | | | |
|---|---|---|---|
| 4,937,811 A * | 6/1990 | Harris | 370/200 |
| 5,305,355 A * | 4/1994 | Go et al. | 375/356 |
| 5,440,555 A * | 8/1995 | Momona | 370/455 |
| 5,475,818 A | 12/1995 | Molyneaux et al. | 709/208 |
| 5,481,456 A | 1/1996 | Ogura | 701/1 |
| 5,697,048 A | 12/1997 | Kimura | 725/75 |
| 6,021,308 A | 2/2000 | Kimura | 725/75 |
| 6,208,924 B1 | 3/2001 | Bauer | 701/45 |
| 6,507,158 B1 * | 1/2003 | Wang | 315/294 |
| 6,805,375 B2 * | 10/2004 | Enders et al. | 280/735 |
| 6,931,050 B1 * | 8/2005 | Bottomley | 375/130 |

FOREIGN PATENT DOCUMENTS

WO    WO 9426558    * 10/1994

* cited by examiner

*Primary Examiner*—Ricky Q. Ngo
*Assistant Examiner*—Kibrom T Hailu
(74) *Attorney, Agent, or Firm*—Bruce E. Harang

(57) ABSTRACT

The invention comprises several vehicle parameters transducers (1, 2, 3, 4) associated to respective slave circuits (10, 20, 30, 40) connected by a single, time-shared serial bus (60) with a master slave (50) which, when activated from a digital processing unit (DP), performs a communication with each one of the slave circuits, a bit frame circulating through said serial bus (60) according to a transmission protocol, without error correction, formed by a series of bit packets, each one with information from a corresponding slave circuit and separated by a short time interval, which information is stored in said master circuit (50) from where it is acquired by the (DP) through a parallel bus (70).

15 Claims, 4 Drawing Sheets

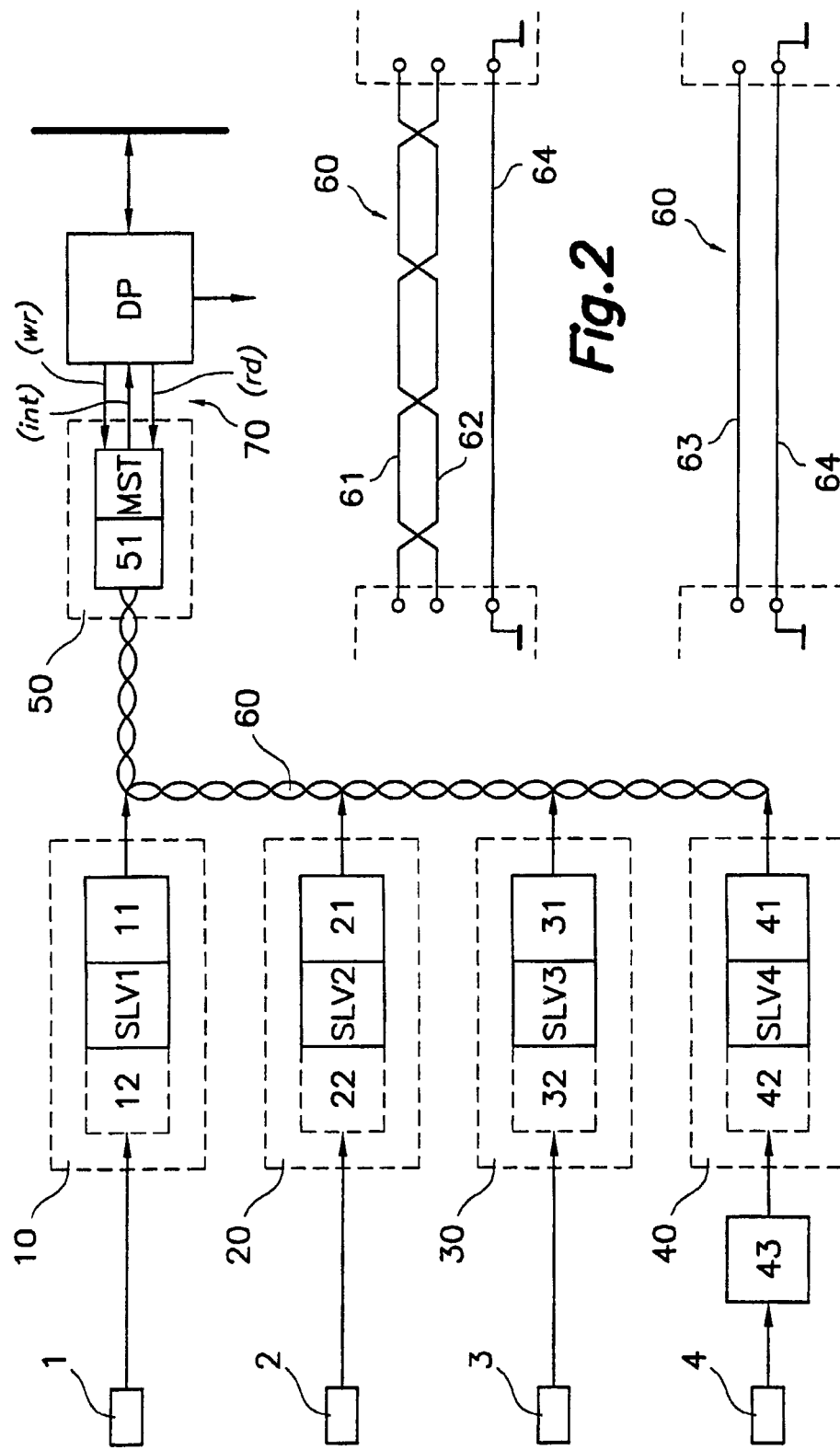

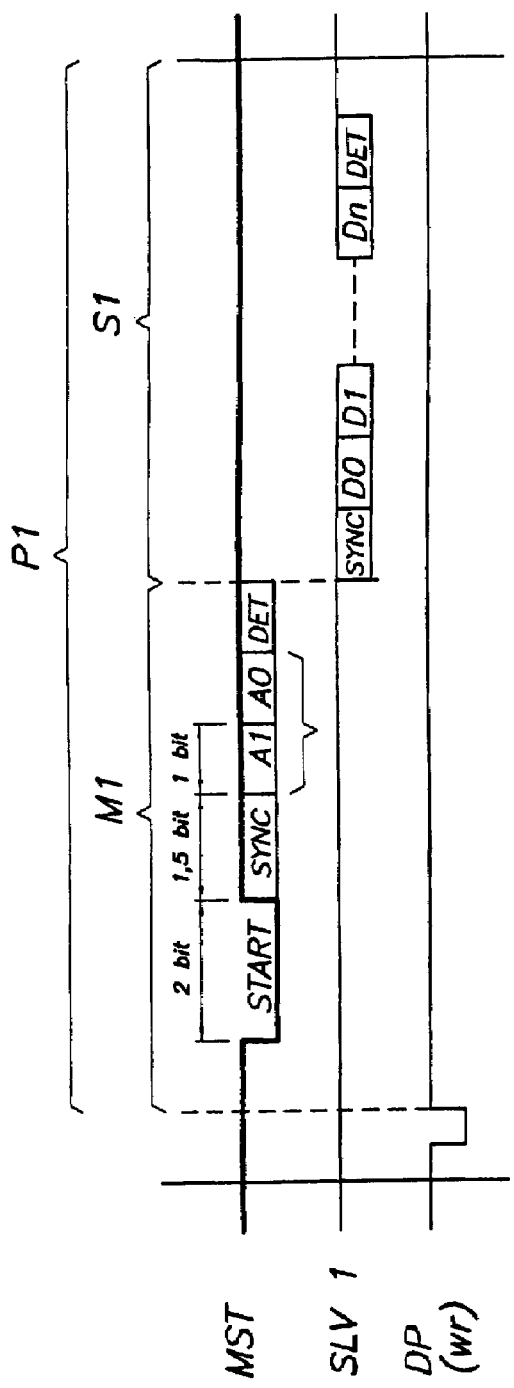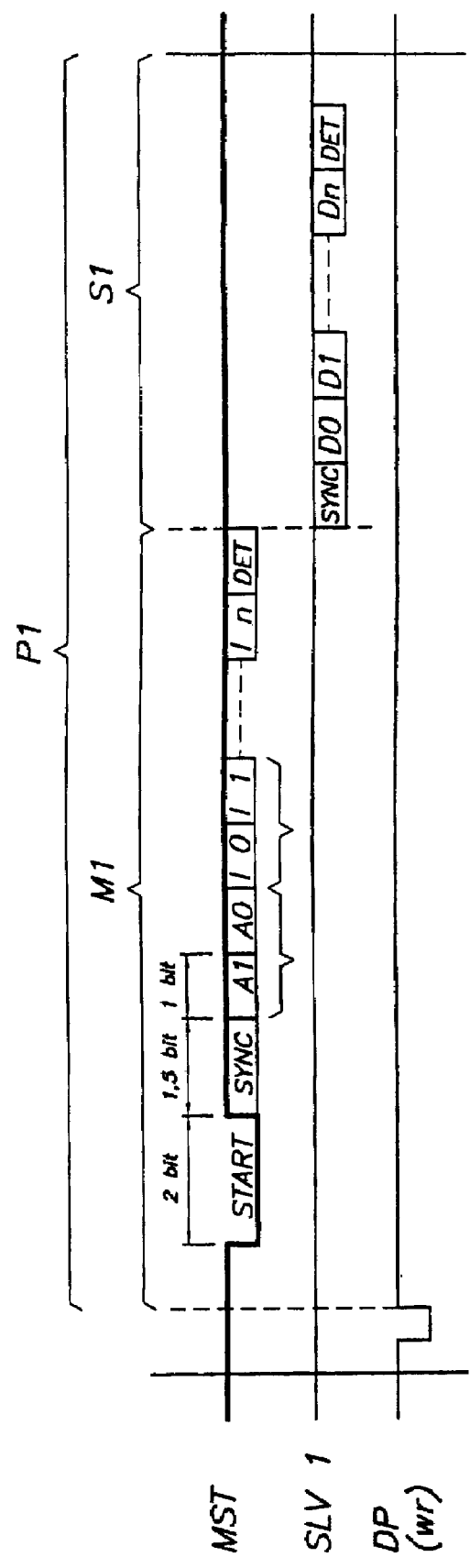

DISTRIBUTED SYSTEM AND METHOD FOR THE REMOTE ACQUISITION OF DATA IN PACKETS WITH A COMMUNICATION PROTOCOL WHICH OPTIMIZES THE TRANSMISSION SPEED

BACKGROUND OF INVENTION

The present invention relates to a distributed system and to a process for acquiring remote data in packets with a communication protocol optimizing the transmission speed. These system and process are applicable in the automotive industry for quickly and effectively controlling certain operation parameters or functions in a vehicle through a single time-shared bus.

Different data processing and communications systems applied to vehicles are known in the state of the art.

European patent number 0653856, to Regie Nationale des Usines Renault, S.A., discloses a process and device for evaluating the quality of a communication network assembled in an automotive system and comprises several electronic modules connected by means of a communication bus and which emit each one of the signals in the form of frames composed of high and low binary states. A measurement is taken of the transaction time difference between said high and low binary states on each signal frame circulating in the bus for a constant tension difference representative of this transition and set by the features of the bus. Said measurement is carried out by means of one or several particular bits located outside of the frame arbitration area. A maximum time difference is sought and compared with a predefined maximum value for a configuration of the vehicle.

European patent number 0681383, to Regie Nationale des Usines Renault, S.A., discloses a process for transmitting messages between modules of a communication network connected by a bus, such that the frame emitter module defines a field in the identifier of addresses of each frame; it initializes the content of the field of the first frame to be emitted with a value known by all recipient modules; it increases the content of the field; it modulates its maximum value in each frame emission; and such that each receptor module accepts the frame after a filtering by comparison of one part of said field with a memorized model and by comparison between the identifier field of the frame and one or several indicators memorized in view of its use in the application of the module. This process is applied to a communication network assembled in an automotive vehicle.

U.S. Pat. No. 5,697,048, to Pioneer Electronic Corporation, discloses a data communication system assembled in a vehicle provided with at least one master unit, a plurality of slave units and a communication bus. Each one of the slave units is provided with a first recipient device for receiving communication data transmitted through the communication bus; a first assessment device to evaluate whether the first recipient device has failed in the reception of the data or not; and a first transmission device to transmit recognition data to indicate a failure in the reception of the first recipient device in case the first assessment device has assessed that a reception failure has occurred. The master unit is provided with a second transmission device to transmit communication data emitted to the slave units; a second recipient device to receive the transmitted recognition data; a second assessment device to assess whether the data corresponding to the transmitted communication data have been received by the second recipient device; and a process control device to carry out a certain process to face the failure of the first recipient device. The system is prepared for being used in a component network of an audio-visual (AV) system in the vehicle.

European patent number 0849122, by Temic Telefunken Microelectronic GMbH, discloses a process for transmitting digital data from a central unit and several control modules connected thereto such that they are suitable for the communication of control information, especially for controlling safety devices in an automobile, through a bus system. When a critical state is detected from the safety point of view, the control information contains suitable orders warning of said critical safety state, using a first transmission protocol in which the central unit emits the control information to those units corresponding to the control modules. In critical safety cases, the data transmission speed increases, activating a second transmission protocol, which does not provide any re-emission of control information, it is therefore shorter than the first protocol.

The present invention proposes a distributed system and a process for acquiring remote data in packets with a communication protocol, especially characterized by optimizing the transmission speed, being particularly applicable to the follow-up and control of the values of signals provided by a series of transducer devices distributed in different parts of an automotive vehicle, and which follow different analog or digital variables. These variables can correspond to vehicle operation parameters or functions, such as tire pressure and temperature, engine lubricating oil pressure and temperature, battery charge and voltage level, temperatures in different elements or areas of the vehicle, status of switches, ABS equipment, stereo equipment, speech or sound emission signals with the possibility of echo canceling, etc.

The system of the present invention comprises a digital processing unit associated to a combined master or main circuit and slave or subordinate circuits system, both provided with digital processors, connected to each other through a single, time-shared communications serial bus. Each one of said slave circuits is associated to a transceiver device. The master circuit is provided to perform, upon petition of an activation by said digital processing unit, a repetitive or non-repetitive communication with each one of the slave circuits, during which communication a bit frame circulates through said time-shared serial bus according to a transmission protocol formed by a series of bits packets separated by a short time interval.

Each one of said packets associated to a corresponding slave circuit comprises:
a start bit, which has a longer duration or length than the data bits, so that they can be fully identified; a delay/synchronism bit for the frames going from master to slave; one or more (according to the number of slave devices present in the system) address bits indicating the slave device to be consulted; and several data bits containing information sent to/or coming from each slave device.

The information from the slave circuits is stored in said master circuit in arrayed entries containing said data bits, which are susceptible to be acquired sequentially by the digital processing unit through a parallel bus and upon the petition of a reading order from said digital processing unit, while the repetitive master circuit communication with the slave circuit continues for carrying out a new consultation cycle. In turn, the digital processing unit is linked to a bus of the vehicle, such as a CAN or other type of bus.

An essential feature of the present invention is that, in order to maximally increase the data acquisition and processing speed, the protocol does not incorporate any transmission/reception error correction routine, although it preferably includes an error detection bit, therefore the system simply skips over the detected errors, going on to the reading of the following data packet. In other words, the system gives priority to the acquisition of a new data packet from a certain slave circuit over the integral (or corrected) recovery of a preceding data packet which has undergone an error in the transmission/reception thereof. This is possible due to the high transmission frequency in the data packet flow, such that the unexpected loss of one of them is not a significant disturbance for controlling the parameter involved.

The system uses the Manchester format to encode each bit of the bit packets. In each bit packet, the length of said start bit is at least two times the length of each one of the data bits of the packet, whereas the delay/synchronism bit length is at least 1.5 times the length of one of said data bits. The start bit is provided for generating a reinitialization of all the slave circuits. Preferably, each bit packet further includes an additional protocol error detection bit in the last place of the data field or address field. Each bit packet optionally contains, in addition to the address bit or bits, data bits sent to the slave device, being transmitted such that they are univocally recognized by the slave device.

The system only admits digital form signals, therefore, when one of said transducer devices provides an analog signal, as is the case, for example, in a fuel tank level transducer, the transducer is then associated to an analog/digital converter connected to the corresponding slave circuit.

BRIEF DESCRIPTION OF DRAWINGS

The invention will be better understood from the following detailed description of a preferred embodiment example with references to the attached drawings, wherein:

FIG. 1 shows an illustrative scheme of the distributed system for acquiring remote data according to the present invention;

FIGS. 2 and 2a show two conformation variants of the serial bus of FIG. 1;

FIGS. 4 and 4a show enlarged details of the diagram of FIG. 3; and

DETAILED DESCRIPTION

Figure 3:
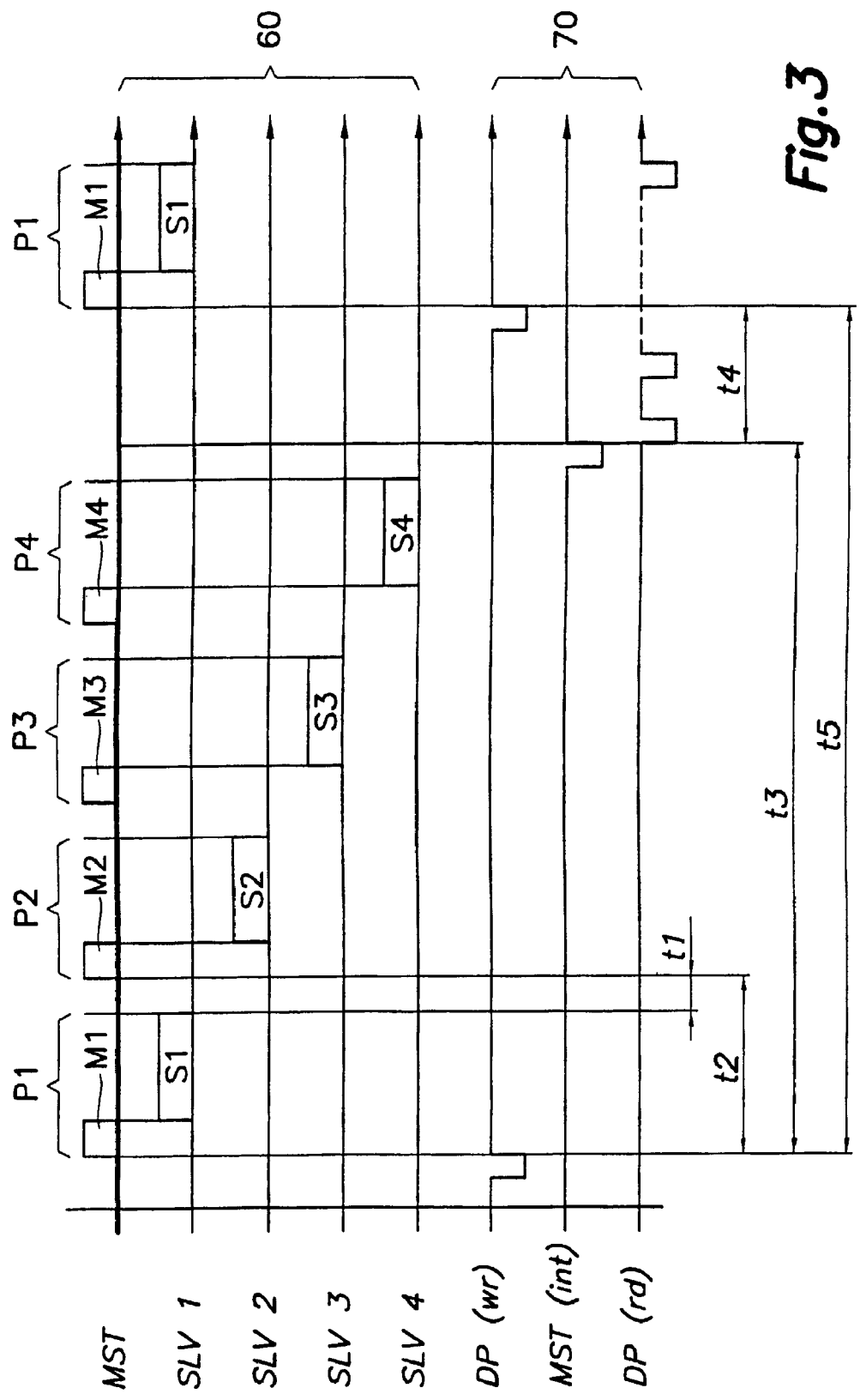
FIG. 3 shows a general diagram of the protocol used by the system of FIG. 1 on a time scale.

First in reference to FIG. 1, it shows the elements composing the distributed system for acquiring remote data in packets with a communication protocol of the present invention, which optimizes the transmission speed. This system is particularly applicable to the follow-up and control of the values of signals provided by a series of transducer devices 1, 2, 3, 4 distributed in different parts of an automotive vehicle and which follow different analog and digital variables, such as tire pressure and temperature, engine lubricating oil pressure and temperature, battery charge level, engine coolant liquid temperature, status of switches, etc. Each signal corresponding to one of said variables is received in a slave, or subordinate, circuit 10, 20, 30, 40 provided with a slave digital processor SLV1, SLV2, SLV3, SLV4 and a transceiver device 11, 21, 31, 41 capable of receiving and sending signals. Since the digital processors only admit digital format signals, when one of the transducers 1, 2, 3, 4 provides an analog signal, it is necessary to arrange an A/D (analog/digital) converter 12, 22, 32, 42 at the inlet of the corresponding slave circuit 10, 20, 30, 40. On the other hand, in the example shown in FIG. 1, the transducer 4 provides a signal, such as an audio signal, which needs to be suitably processed in a signal processor 43 before being introduced in the slave circuit 40.

The assembly of slave circuits 10, 20, 30, 40 is connected with a master, or main, circuit 50 through a single, time-shared serial communications bus 60. Said master circuit 50 comprises a master digital processor MST and a transceiver 51 capable of receiving and sending signals, and is in turn connected to a digital processing unit DP through a parallel bus 70. It is evident that, although the illustrated example shows four slave circuits 10-40, the invention is not limited to this number, being possible for there to be any number thereof connected to said master circuit 50 through said serial bus 60.

FIG. 2 shows a possible configuration for the serial bus 60 of FIG. 1, in which the latter is formed by a twisted differential cable comprising two insulated copper conductors 61, 62 twisted together, optionally in shunt with a reference or mass line 64. FIG. 2a shows another possible alternative configuration for the serial bus 60, in which the bus comprises a single insulated copper conductor 63 in shunt with a reference or ground line 64.

The general process of the system of the present invention is shown in FIG. 3. First, said digital processing unit DP directs a consultation order through parallel bus 70, by means of the activation of a signal wr, to the digital processor MST of the master circuit 50 so that it performs a sequential, repetitive or non-repetitive communication with each one of the digital processors SLV1, SLV2, SLV3, SLV4 of the slave circuits 10, 20, 30, 40 through the time-shared serial bus 60, through which a bit frame M1, S1-M4, S4 circulates according to a predetermined transmission protocol without error correction. This protocol is formed by a series of bit packets P1-P4 separated by a short time interval t1, each one of said bit packets P1-P4 comprising a respective interrogation bit cluster M1-M4 coming from the master circuit to the corresponding slave circuit and a respective response bit cluster S1-S4 coming from the corresponding slave circuit to the master, where said response bit clusters S1-S4 are sequentially stored in arrayed entries. Said time interval t1 between each data packet P1-P4 is necessary for absorbing the possible mis-matching occurring due to the different clocks of the master digital processors MST and slave digital processors SLV1-SLV4. The two-way transmission of each bit packet P1-P4, including said corresponding time interval t1, uses a time t2, and the sum of the times t2 corresponding to the interrogation-response of the four slaves SLV1-SLV4 is a time t3. At the end of said time t3, i.e., at the end of transmission of the interrogation bit packet P4 and response corresponding to the last slave circuit SLV4, the digital processor MST of the master circuit 50 can direct an interruption order int through the parallel bus 70 to the digital processing unit DP to communicate to it that a consultation sequence of the slave circuits has concluded and that all the data are available so that it will establish a predetermined time period t4, during which time the digital processing unit DP performs the reading rd of said data received from the slaves SLV1-SLV4 and stored in the master MST. At the end of said time period t4, the digital processing unit DP directs a new consultation order through the parallel bus 70, by means of the activation of a signal wr, to the digital processor MST of the master circuit 50 so that it will begin a new interrogation-response-reading cycle. Thus, the total cycle time t5 is equal to the sum of the aforementioned times t3 and t4. However, after the second interrogation-response cycle, the digital processing unit DP is capable of reading data stored in the master digital processor MST through the parallel bus 70 simultaneously with the running of a new consultation cycle through the serial bus 60.

Now in reference to FIG. 4, it shows the composition of each one of said bit packets P1-P4, taking the bit packet P1 associated to the slave digital processor SLV1 as an example, which in the first place comprises said interrogation bit cluster M1 coming from said master circuit to the corresponding slave circuit, which includes a start bit START, with a longer duration/length than the data bits, so that it is fully identified; 1.5 delay/synchronism bits SYNC for the bit frames going from master to slave; and one or more address bits A1, A0, according to the number of slave devices, indicative of the slave device SLV1 to be consulted. It also optionally includes an error detection bit DET. Then, the bit packet P1 comprises said response bit cluster S1, coming from the corresponding slave circuit to the master, which bit cluster S1 includes a delay/synchronism bit SYNC followed by a bit series D0 ... Dn corresponding to the data of the parameter picked up by the corresponding transducer device 1 associated to the slave circuit 10. An error detection bit DET is also optionally included here. Obviously, the remaining bit packets P2-P4 are similar to the disclosed bit packet P1. As has been indicated above, said start bit START has a duration which is longer than that of the other bits so that it can be clearly identified. Said duration of the start bit START is preferably two times the duration of a standard bit.

FIG. 4a shows a variant for said bit packet P1, which is equal to the bit packet P1 of FIG. 4 in everything except that the interrogation bit cluster M1 also includes several data bits I0, In, containing information interactively transmitted to the corresponding slave circuit 10.

Figure 5:
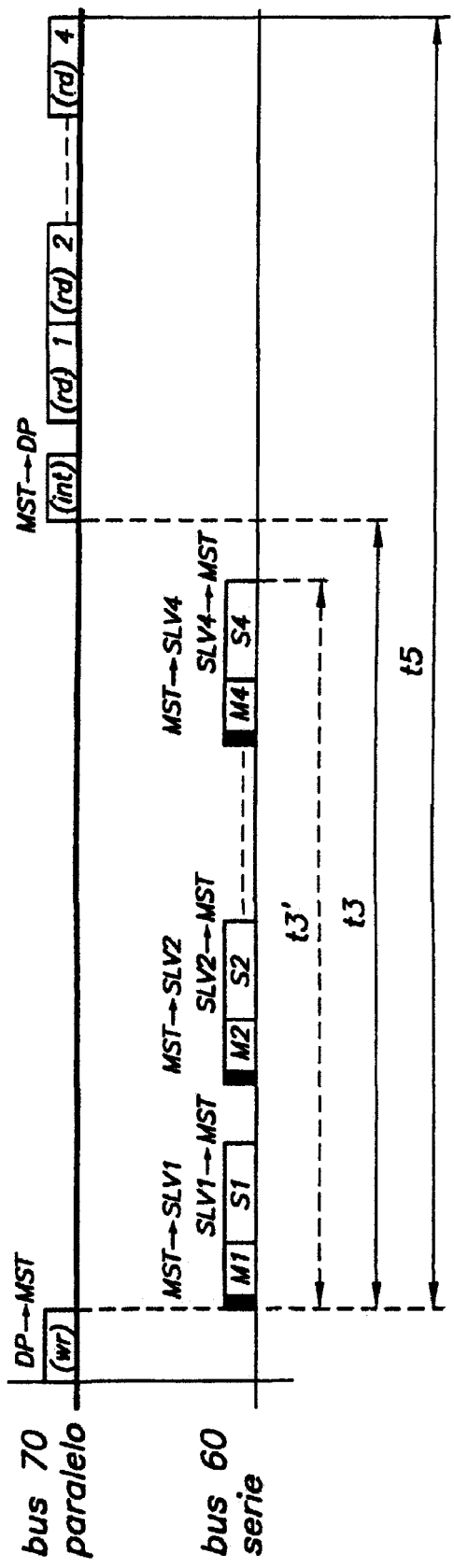
FIG. 5 shows a scheme of the different bit frames circulating through the buses of the system of FIG. 1 on a time scale.

FIG. 5 shows the bit frame flows through the serial bus 60 and the parallel bus 70 on a time scale. At the start of each interrogation-response sequence, a writing order wr from the digital processing unit DP circulates through the parallel bus 70 to the master digital processor MST so that said master acquires and stores the data of the parameters supplied by the corresponding transducers 1-4 to the corresponding slave circuits 10-40. At the end of said sequence, the master digital processor MST can generate an interruption order int to the digital processing unit DP. Immediately after, the digital processing unit DP can read said parameters by means of the activation of the signal rd and the corresponding address bits to specify the parameter. Through the serial bus 60, said bit clusters M1 alternatively circulate from the master MST to the different slaves SLV1-SLV4 and the bit clusters S1-S4 from the different slaves SLV1-SLV4 to the master MST. This communication through the serial bus 60 is two-way and interactive. If a time t3" corresponding to a complete interrogation-response sequence between the master MST and slaves SLV is programmed accurately, the interruption order int from the master digital processor MST to the digital processing unit DP can be omitted.

The invention claimed is:

1. A distributed system for acquiring remote data in packets with a communication protocol optimizing the transmission speed, particularly applicable to the follow-up and control in an automotive vehicle of the values of signals provided by a series of transducer devices distributed in different parts of the vehicle and which follow different analog or digital values, characterized in that: said transducer devices are associated to respective slave/subordinate circuits which are connected, through a single, time-shared serial communications bus, to a master/main circuit, which in turn is connected to a digital processing unit through a parallel bus, each one of said slave circuits and master circuit being provided with a respective digital processor and a respective transceiver device, and which master circuit is provided so as to perform, upon petition of an activation by said unit, a repetitive or non-repetitive consultation, setting up communication with each one of the slave/subordinate circuits according to a communication protocol without error correction which includes a series of bit packets, each one of which comprises:
   a start bit with a longer duration/length than the data bits so that it is fully identified;
   1.5 delay/synchronism bits for the frames going from master to slave;
   one or more address bits, indicative of the slave/subordinate circuit to be consulted; and
   several data bits containing information coming from the consulted slave/subordinate circuit.

2. A system according to claim 1, characterized in that said start bit of each bit packet, with a longer duration/length than the data bits, is provided so as to generate a reinitialization of all the slave/subordinate circuits.

3. A system according to claim 1, characterized in that said start bit of each bit packet has a duration of at least two times that of each one of the data bits of the packet.

4. A system according to claim 1, characterized in that each bit of the packet in address, data or error detection functions, is encoded in Manchester format.

5. A system according to claim 1, characterized in that each bit packet includes an additional protocol error detection bit in the data field or address field.

6. A system according to claim 5, characterized in that said error detection bit is the last one of each packet.

7. A system according to claim 1, characterized in that a short time interval of separation between bit packets circulating through the serial bus is comprised within a range of 0 to 1 bit.

8. A system according to claim 1, characterized in that said serial bus is formed by a twisted differential cable comprising two twisted insulated copper conductors in shunt with a ground line.

9. A system according to claim 1, characterized in that said serial bus is formed by a single insulated copper conductor in shunt with a ground line.

10. A system according to claim 1, characterized in that each one of those transducer devices providing an analog signal is associated to an A/D converter connected to the corresponding slave/subordinate circuit transceiver.

11. A system according to claim 1, characterized in that said digital processing unit is linked to another bus of the vehicle, such as a CAN or other type of bus.

12. A system according to claim 1, characterized in that each bit packet contains, in addition to said one or more address bits, data bits susceptible to being transmitted from the master circuit to the consulted slave/subordinate circuit, such that they are univocally recognized by said slave/subordinate circuits.

13. A process for acquiring remote data in packets with a communication protocol optimizing the transmission speed, particularly applicable to the follow-up and control in an automotive vehicle of the values of signals provided by a series of transducer devices distributed in different parts of the vehicle and which follow different analog or digital values, integrated in a system according to claim 1, characterized in that:
   said master circuit, upon petition of the application thereto of a signal emitted by said digital processing unit, performs a repetitive or non-repetitive consultation of each one of the slave/subordinate circuits through the parallel bus, setting up communication with them through said time-shared serial bus by means of said bit packets according to said transmission protocol without error correction;

the slave/subordinate circuits transmit said data bits in response to said consultation, which data are stored in said master circuit in arrayed entries;

the master circuit sends an interruption order through a parallel bus, by means of the activation of a signal, to the digital processing unit indicative of the end of the consultation cycle; and the digital processing unit acquires, by means of the activation of a reading order, the data bits stored in the master circuit while the system continues with a new consultation communication between the master circuit and the slave/subordinate circuits.

14. A process according to claim 13, characterized in that said consultation cycles between master circuit and slave/subordinate circuits and acquisition of data stored in the master circuit from the digital processing unit are carried out cyclically at a predetermined frequency imposed by said digital processing unit.

15. A process according to claim 13, characterized in that those bit packets whose transmission has been detected as erroneous by means of said error detection bit are skipped over, passing to the next bit packets.

* * * * *